United States Patent
Eichenberger et al.

(10) Patent No.: US 8,397,052 B2
(45) Date of Patent: Mar. 12, 2013

(54) VERSION PRESSURE FEEDBACK MECHANISMS FOR SPECULATIVE VERSIONING CACHES

(75) Inventors: Alexandre E. Eichenberger, Chappaqua, NY (US); Alan Gara, Mount Kisco, NY (US); Kathryn M. O'Brien, South Salem, NY (US); Martin Ohmacht, Yorktown Heights, NY (US); Xiaotong Zhuang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/543,688

(22) Filed: Aug. 19, 2009

(65) Prior Publication Data

US 2011/0047362 A1 Feb. 24, 2011

(51) Int. Cl.
 *G06F 9/318* (2006.01)
(52) U.S. Cl. .................. 712/214; 711/125; 718/104
(58) Field of Classification Search .................. None
See application file for complete search history.

(56) References Cited

U.S. PATENT DOCUMENTS

| | | | |
|---|---|---|---|
| 6,438,677 B1 | 8/2002 | Chaudhry et al. | |
| 6,457,104 B1 | 9/2002 | Tremaine et al. | |
| 6,587,937 B1 | 7/2003 | Jensen et al. | |
| 7,082,601 B2 * | 7/2006 | Ohsawa et al. | 717/149 |
| 7,321,989 B2 | 1/2008 | Grayver | |
| 7,395,418 B1 | 7/2008 | Caprioli et al. | |
| 7,404,041 B2 | 7/2008 | Gara et al. | |
| 7,444,544 B2 | 10/2008 | Bose et al. | |
| 7,606,979 B1 | 10/2009 | Rozas et al. | |
| 2003/0126375 A1 | 7/2003 | Hill et al. | |
| 2003/0217080 A1 | 11/2003 | White et al. | |
| 2004/0154019 A1 | 8/2004 | Aamodt et al. | |
| 2005/0120179 A1 | 6/2005 | Akkary et al. | |
| 2005/0154944 A1 | 7/2005 | Reinhardt et al. | |
| 2005/0262301 A1 | 11/2005 | Jacobson et al. | |

(Continued)

FOREIGN PATENT DOCUMENTS

| | | |
|---|---|---|
| EP | 1 643 371 A2 | 4/2006 |
| WO | WO 2008/088931 A2 | 7/2008 |

OTHER PUBLICATIONS

Eichenberger, Alexandre E. et al., "Checkpointing in Speculative Versioning Caches", U.S. Appl. No. 12/544,704, filed Aug. 20, 2009.

(Continued)

*Primary Examiner* — Kenneth Kim
(74) *Attorney, Agent, or Firm* — Stephen J. Walder, Jr.; William J. Stock

(57) ABSTRACT

Mechanisms are provided for controlling version pressure on a speculative versioning cache. Raw version pressure data is collected based on one or more threads accessing cache lines of the speculative versioning cache. One or more statistical measures of version pressure are generated based on the collected raw version pressure data. A determination is made as to whether one or more modifications to an operation of a data processing system are to be performed based on the one or more statistical measures of version pressure, the one or more modifications affecting version pressure exerted on the speculative versioning cache. An operation of the data processing system is modified based on the one or more determined modifications, in response to a determination that one or more modifications to the operation of the data processing system are to be performed, to affect the version pressure exerted on the speculative versioning cache.

21 Claims, 6 Drawing Sheets

U.S. PATENT DOCUMENTS

| | | |
|---|---|---|
| 2006/0085588 A1 | 4/2006 | Rajwar et al. |
| 2006/0195648 A1 | 8/2006 | Chandrasekaran et al. |
| 2007/0186053 A1 | 8/2007 | Chaudhry et al. |
| 2008/0016393 A1 | 1/2008 | Bose et al. |
| 2008/0021934 A1 | 1/2008 | Hudson et al. |
| 2008/0172548 A1 | 7/2008 | Caprioli et al. |
| 2010/0122036 A1* | 5/2010 | Radovic et al. ............... 711/137 |

OTHER PUBLICATIONS

International Preliminary Report on Patentability dated Mar. 1, 2012 for International Application No. PCT/US2010/042383, 7 pages.

Ceze, Luis et al., "Bulk Disambiguation of Speculative Threads in Multiprocessors", IEEE, Proceedings of the 33rd International Symposium on Computer Architecture (ISCA'06), 2006, 12 pages.

Gopal, Sridhar et al., "Speculative Versioning Cache", Proceedings of the 4th International Symposium on High-Performance Computer Architecture, Jan. 31 to Feb. 4, 1998, pp. 1-11.

ISR and Written Opinion mailed Oct. 4, 2010 for International Application No. PCT/US2010/042383, 8 pages.

USPTO U.S. Appl. No. 12/544,704.

Office Action mailed Aug. 1, 2012 for U.S. Appl. No. 12/544,704; 21 pages.

Response to Office Action filed with the USPTO on Nov. 1, 2012 for U.S. Appl. No. 12/544,704, 35 pages.

* cited by examiner

FIG. 5

```
if (spawn-conditions &&
   other-profitablity-metrics &&
   version-pressure < threshold)
   spawn(work ( i+1));
   work( i );
```

FIG. 6

```
if (spawn-conditions)
   n = AmountOfWork(versionPressure,
   otherMetrics)
   spawn(work(i+1,...,i+n));
   work( i );
```

FIG. 7

```
while (i=getWork())
   if (pressure-too-high) wait;
   work( i );
```

FIG. 8

Traditionally:

```
for(i=0, i<N; i++) {
   workNonGuarded(i);
   StartTransaction()
   workGuarded(i);
   CommitTransaction();
}
```

Conditional Aggregation:

```
inTM=0;
clearSpecStats();
for(i=0, i<N; i++) {
   workNonGuarded(i);
   if (! inTM) StartTransaction();
   workGuarded(i);
   if (inTM>Threshold || pressure-too-high)
      CommitTransaction();
      clearSpecStats();
}
```

VERSION PRESSURE FEEDBACK MECHANISMS FOR SPECULATIVE VERSIONING CACHES

This invention was made with United States Government support under Contract No. B554331 awarded by the Department of Energy. THE GOVERNMENT HAS CERTAIN RIGHTS IN THIS INVENTION.

BACKGROUND

The present application relates generally to an improved data processing apparatus and method and more specifically to version pressure feedback mechanisms for speculative versioning caches.

Speculative versioning caches are cache memory structures that are capable of storing multiple versions of a cache line to enable speculative execution of threads in a multithreading data processing environment. Speculative execution of threads is an optimization technique by which early execution of a thread, whose results may or may not be later needed, is performed so as to achieve greater performance should that thread's results be needed during the execution of the code, i.e. should the thread be transitioned from a speculative state to a non-speculative state in which the results are used. A speculative versioning cache is an extension of a typical cache, where the speculative versioning cache is capable of holding data which is accessible only to the hardware thread that wrote it. All modified annotated cache lines can be discarded atomically using a special command (Abort), or made architecturally visible to other threads using another command (Commit).

Depending on the mode, it is possible that data, written by a hardware thread while executing a speculative task, can also be accessed by other threads that are executing tasks that correspond to logical successor tasks. Thus, speculative versioning requires the tracking of the program order among multiple buffered versions of a memory location to guarantee certain sequential program semantics. First, a load must eventually read the value created by the most recent store to the same memory location. This requires that the load must be squashed and re-executed if it executes before the store and incorrectly reads the previous version. Moreover, this requires that all stores to the same memory location that follow the load in program order must be buffered until the load is executed. Second, a memory location must eventually have the correct version of data independent of the order of the creation of the versions. Consequently, the speculative versions of a location must be committed to the architected storage in program order.

Speculative versioning caches support speculative multithreading by providing the ability to store speculative versions of cache lines in association with the speculative threads. One example of a speculative versioning cache is described in Gopal et al., "Speculative Versioning Cache," Proceedings of the 4$^{th}$ International Symposium on High-Performance Computer Architecture, Jan. 31 to Feb. 4, 1998, page 195. In this example of a speculative versioning cache, a private cache is provided for each processor with the system being organized similar to a snooping bus-based cache coherent symmetric multiprocessors (SMP). Memory references that hit in the private cache do not use the bus as in an SMP. Task commits do not write back speculative versions en masse. Each cache line is individually handled when it is accessed the next time.

With the speculative versioning cache described in Gopal et al., programs are partitioned into fragments called tasks which form a sequence corresponding to their order in the dynamic instruction stream. A higher level control unit predicts the next task in the sequence and assigns it to a free processor for execution. Each processor executes the instructions in the task assigned to it and buffers the speculative state created by the task in its private cache. When a task misprediction is detected, the speculative state of all the tasks in the sequence including and after the incorrectly predicted task are invalidated and the corresponding processors are freed. This is referred to as a task squash. The correct tasks in the sequence are then assigned for execution. When a task prediction has been validated, it commits by copying the speculative buffered state to the architected storage, e.g., data cache. Tasks commit one by one in the program order. Once a task commits, its processor is free to execute a new task. Since the tasks commit in program order, tasks are assigned to the processors in program order.

A task executes a load as soon as its address is available, speculating that stores from previous tasks in the sequence do not write to the same location. The closest previous version of the location is supplied to the load. A load that is supplied a version from a previous task is recorded to indicate a use before a potential definition. If a definition, e.g., a store to the same location from a previous task, occurs, the load was supplied with an incorrect version and memory dependence was violated.

When a task executes a store to a memory location, it is communicated to all later active tasks in the sequence. When a task receives a new version of a location from a previous task, it squashes if a use before definition is recorded for that location, i.e. a memory dependence violation is detected. All tasks after the squashed task are also squashed as one a task mis-prediction.

The oldest active task is non-speculative and can commit its speculative memory state, i.e. versions created by stores from this task, to architected storage. Committing a version involves logically copying the versions from the speculative buffers to the architected storage, e.g., data cache. When a task is squashed, the speculative state associated with a task is invalidated and not committed to architected storage.

The private caches of the various processors together constitute the speculative versioning cache. Each cache line of the private caches stores an address tag (Tag) that identifies the data that is cached, a valid bit (V) that identifies whether the cache line is valid or not, a dirty bit (S) that identifies whether a store to the cache line has occurred or not, the data itself, a load bit (L) that identifies whether a task loads from the cache line before storing to the cache line occurs, a pointer (Pointer) that identifies the processor (or L1 cache) that has the next copy/version, if any, in a version ordering list (VOL) for the cache line, and the data itself (Data).

The speculative versioning cache uses combinational logic, referred to as the version control logic (VCL), that provides support for speculative versioning using the VOL. A processor request that hits in the private cache of the processor does not need to consult the VOL. Cache misses issue a bus request that is snooped by the private caches. The states of the requested cache line in each private cache and the VOL are supplied to the VCL. The VCL uses the bus request, the program order among the tasks, and the VOL to compute appropriate responses for each cache. Each cache line is updated based on its initial state, the bus request, and the VCL response.

With speculative execution of threads in a multithreading data processing environment, threads are permitted to execute until there is a dependency violation between two or more threads, e.g., a first thread executes a read of an memory location following by a second thread, that is younger than the first thread, executing a write of the same memory location, or a conflict in which two or more threads attempt to modify the state of the same portion of data in the cache or memory, is encountered. Typically, at this point, one of the threads is permitted to persist its state while the other thread(s) must be squashed, i.e. all work performed by the thread that has not been persisted is rolled-back or aborted. Such squashing of threads is significantly more expensive than a typical cache miss as it results in cancelling all of the work performed by a given speculative thread and possibly all of the work performed by any successor speculative threads as well.

SUMMARY

In one illustrative embodiment, a method, in a data processing system, is provided for controlling version pressure on a speculative versioning cache of the data processing system. The method comprises collecting raw version pressure data based on one or more threads, executing on one or more processors of the data processing system, accessing cache lines of the speculative versioning cache stored in a storage device of the data processing system. The method further comprises generating one or more statistical measures of version pressure based on the collected raw version pressure data. Moreover the method comprises determining whether one or more modifications to an operation of the data processing system are to be performed based on the one or more statistical measures of version pressure, the one or more modifications affecting version pressure exerted on the speculative versioning cache. In addition, the method comprises modifying an operation of the data processing system based on the one or more determined modifications, in response to a determination that one or more modifications to the operation of the data processing system are to be performed, to affect the version pressure exerted on the speculative versioning cache.

In other illustrative embodiments, a computer program product comprising a computer useable or readable medium having a computer readable program is provided. The computer readable program causes a computing device to collect raw version pressure data based on one or more threads accessing cache lines of the speculative versioning cache. The computer readable program further causes a computing device to generating one or more statistical measures of version pressure based on the collected raw version pressure data. Moreover, the computer readable program causes a computing device to determine whether one or more modifications to an operation of the computing device are to be performed based on the one or more statistical measures of version pressure, the one or more modifications affecting version pressure exerted on the speculative versioning cache. In addition, the computer readable program causes a computing device to modify an operation of the computing device based on the one or more determined modifications, in response to a determination that one or more modifications to the operation of the computing device are to be performed, to affect the version pressure exerted on the speculative versioning cache.

In yet another illustrative embodiment, a data processing system/apparatus is provided. The system/apparatus may comprise one or more processors, each processor having at least one thread level versioning cache module implemented in hardware of the processor. The system/apparatus may further comprise a speculative versioning cache storage device coupled to the one or more processors, a hardware implemented global versioning cache module coupled to the speculative versioning cache storage device, and a software control unit coupled to the one or more processors and the hardware implemented global versioning cache module. The hardware implemented global versioning cache module collects raw version pressure data based on one or more threads accessing cache lines of the speculative versioning cache. At least one of the hardware implemented global versioning cache module or the at least one thread level versioning cache module generates one or more statistical measures of version pressure based on the collected raw version pressure data. The software control unit determines whether one or more modifications to an operation of the data processing system are to be performed based on the one or more statistical measures of version pressure, the one or more modifications affecting version pressure exerted on the speculative versioning cache. Moreover, the software control unit modifies an operation of the computing device based on the one or more determined modifications, in response to a determination that one or more modifications to the operation of the computing device are to be performed, to affect the version pressure exerted on the speculative versioning cache.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example portion of code illustrating a thread throttling action for addressing version pressure in accordance with one illustrative embodiment;

FIG. 6 is an example portion of code illustrating a workload throttling action for addressing version pressure in accordance with one illustrative embodiment;

FIG. 7 is an example portion of code illustrating an idling thread action for addressing version pressure in accordance with one illustrative embodiment;

FIG. 8 is an example diagram illustrating a transaction aggregation action for addressing version pressure in accordance with one illustrative embodiment.

DETAILED DESCRIPTION

Figure 1:
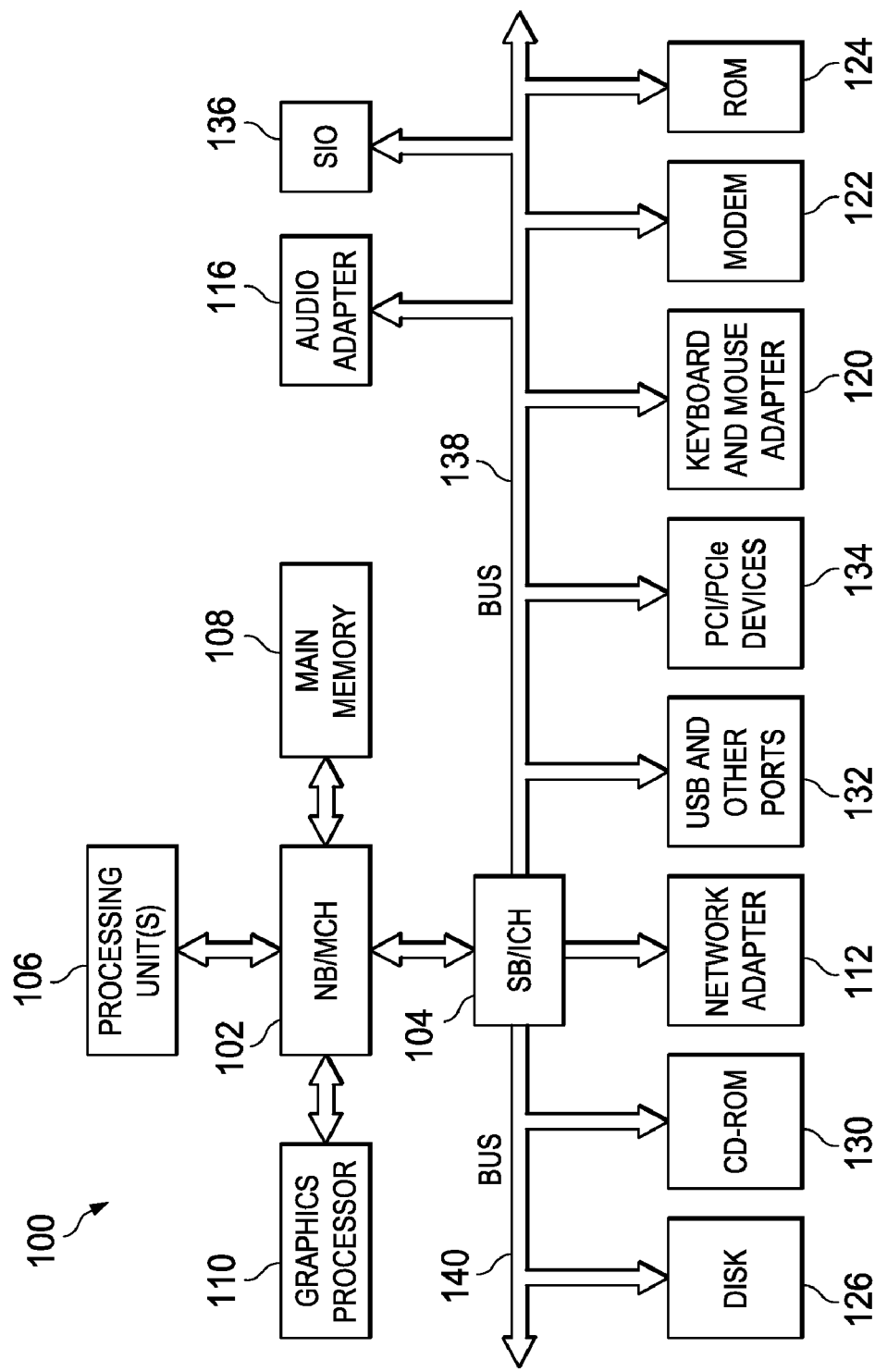
FIG. 1 is an example block diagram of a data processing system is shown in which illustrative embodiments may be implemented.

As mentioned above, with speculative versioning caches (SVCs), multiple versions of a cache line are preserved in the SVC. An SVC cache is organized with a given number of cache line sets, each cache line set having a given number of cache lines (the associativity number). When processing a memory request, the address is used to determine to which cache line set this address belongs. Once the cache line set is determined, the cache determines if the cache line that is associated with the given address is present or not in the determined cache line set. To do so, the cache accesses the tags (i.e. meta information that indicates the address and version corresponding to the cache lines presently in the cache line set) to determine if a cache hit (correct address and version being present) or cache miss (none of the cache lines correspond to the requested address/version currently in this cache line set) occurs.

With speculative versioning caches (SVCs), if there is an access violation, e.g., a dependency violation, threads or transactions may be squashed resulting in considerable overhead costs. In addition, threads may be squashed due to conflict misses. Conflict misses occur when there is not enough storage in the SVC for all of the current versions of a cache line. The likelihood of a conflict miss is increased by the fact that, unlike normal cache structures, with an SVC, cache lines with a speculative state cannot be evicted from the SVC since they typically are not backed in architecture storage, e.g., the data cache or main memory. Thus, if a cache line with a speculative state must be evicted, such as to provide additional storage space for other speculative threads, then the speculative thread associated with the evicted speculative state cache line must be squashed. Moreover, when a thread is squashed, typically all child threads are also squashed. Child threads correspond to threads executing tasks that are logically after the current thread's task in the original program order. With the squashing of threads and child threads, a large overhead cost, due to the utilization of resources with no beneficial result being generated, and the need to restart the squashed threads, may be encountered when there are conflict misses.

The likelihood of a conflict miss occurring increases with the number of threads executing in the data processing system. Moreover, applications having "hot spot" characteristics, i.e. portions of the application that are executed often, may greatly increase the likelihood of a conflict miss since such hot spots increase the number of versions of the cache lines for these hot spots that need to be maintained in the SVC. If there are a large number of cache line sets, the likelihood of a conflict miss may be reduced, in the absence of hot spots, as memory accesses with uniform distributions will be distributed in a larger number of cache sets and thus, decrease the number of speculative memory requests that compete for a given number of cache lines within each cache line set in the cache. In addition, if the cache is organized with a higher degree of associatively, the likelihood of a conflict miss will decrease since high associativity caches provide more cache lines in each cache line set. Thus each cache line set will be able to accommodate more speculative versions.

While software can control the level of speculation, there is currently no effective mechanism for the software to know how likely a conflict miss situation is to occur. In other words, the software mechanisms, be it a compiler, operating system, runtime environment, or the like, cannot evaluate the "version pressure" experienced by the speculative version cache. In the context of the present description, the term "version pressure" refers to the likelihood that a speculative versioning cache will not have sufficient storage space to store all of the various versions of the cache lines necessary to support speculative execution of the threads in the data processing system.

For example, for a given cache line set X in a speculative versioning cache with a set associativity of 16, if there are no speculative cache lines within the 16 cache lines present in cache line set X, then the version pressure is said to be null. If, however, there are 15 speculative lines within the 16 cache lines in cache line set X, then the version pressure is said to be very high. Thus, the term "version pressure" corresponds to a metric proportional to the fraction of speculative cache lines in a given cache line set, or by extension, in the entire speculative versioning cache.

The illustrative embodiments provide a mechanism for providing version pressure feedback for speculative versioning caches. In one illustrative embodiment, a hardware mechanism is provided for generating pressure feedback information on a per-thread or per-cache version pressure module basis and providing such pressure feedback information to a software mechanism, such as a compiler, operating system, runtime environment, or the like, so that the software mechanism can react accordingly. The software mechanism may react in any of a number of different ways. For example, the software mechanism may, based on the pressure feedback information, control the number of active threads, control the amount of work within spanned threads, or control the duration of transactions. Transactions are tasks whose changes must occur atomically, namely where either all the changes occur or none of the changes occur. In a transactional model, the decision of whether allowing the change to occur or not depends on whether other tasks and/or transactions touched some of the same data accessed by this task. When no other tasks and/or transactions touched the data associated with the given transaction, then the transaction's changes are allowed to be reflected in the non-speculative state. When some other tasks and/or transactions touched some of the data also touched by the given transaction, then the given transaction may fail, and or the other transactions that touched some of the same data will fail. Changes performed by failing transactions must not be allowed to be committed in the non-speculative state.

With the basic mechanism of the illustrative embodiments, each thread of a data processing system has an associated thread version pressure module. The speculative versioning cache further has an associated global version pressure module. The global version pressure module maintains and updates version pressure information for sets of cache lines, i.e. a set of different versions of the same cache line, present in the speculative version cache. Such version pressure information is updated in response to a cache line miss or cache line replacement operation. The information for the set of cache lines is then propagated from the global version pressure module to individual thread pressure version modules of the individual threads along with data returned from a version of the cache line in response to a request from the thread. Thus, the individual threads' associated version pressure modules receive the version pressure information for the particular sets of cache lines that are accessed by the particular threads. Based on the version pressure information maintained in the individual thread version pressure modules, software mechanisms may perform, for each individual thread, one or more of the various modifications to the execution of threads noted above.

As will be appreciated by one skilled in the art, the present invention may be embodied as a system, method, or computer program product. Accordingly, various aspects and features of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the various aspects and features of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
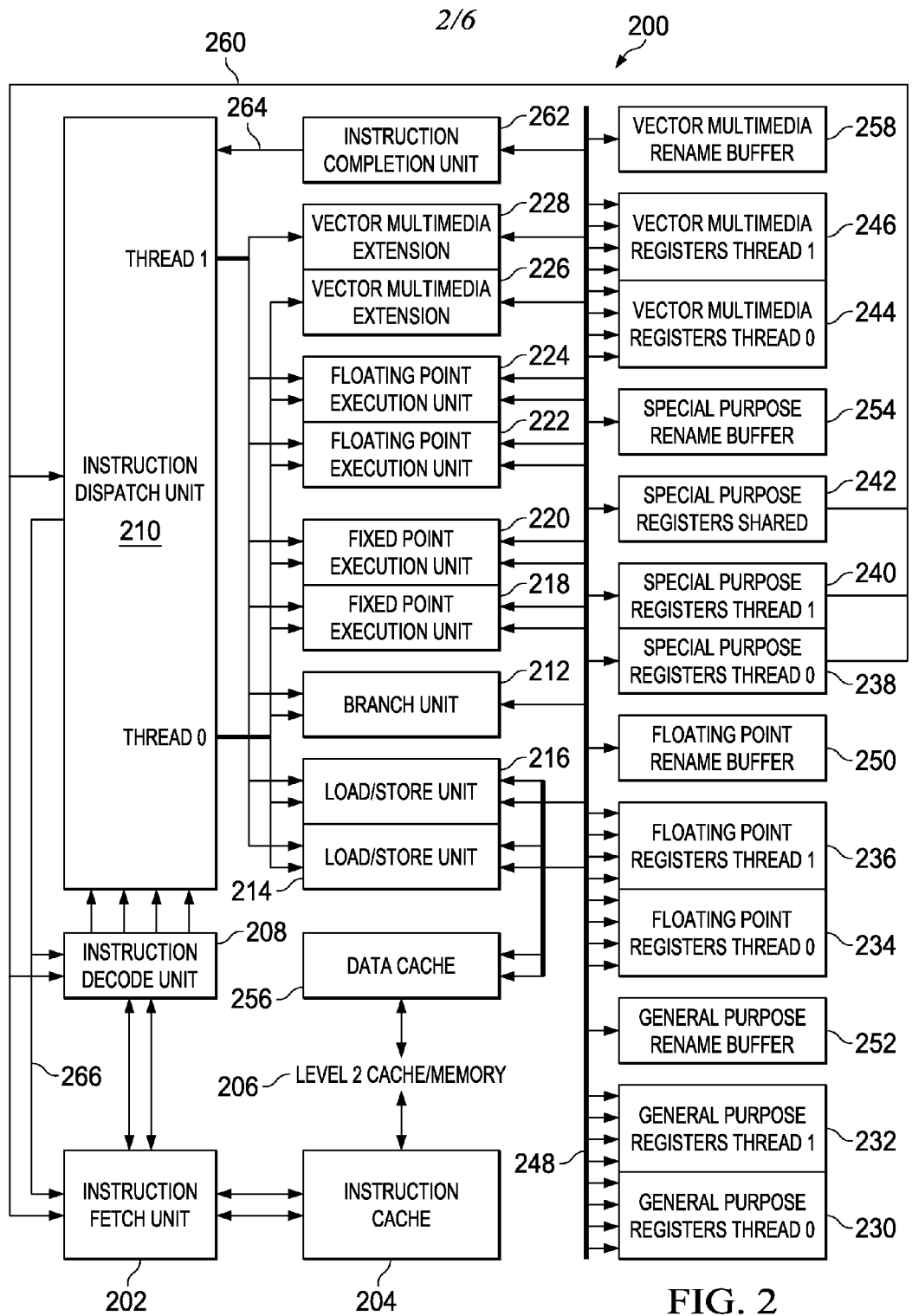
FIG. 2 is an example block diagram of a conventional dual threaded processor design showing functional units and registers is depicted in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a runtime dependence-aware scheduling mechanism that schedules and executes independent iterations ahead of time in parallel with other iterations, this is only an example and is not intended to state or imply any limitation with regard to the features of the present invention. To the contrary, the illustrative embodiments are intended to include distributed data processing environments and embodiments in which independent iterations are scheduled at runtime and executed ahead of time in parallel with other iterations With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Referring to FIG. 2, an exemplary block diagram of a conventional dual threaded processor design showing functional units and registers is depicted in which aspects of the illustrative embodiments may be implemented. Processor 200 may be implemented as processing unit 106 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 248.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the mechanism of the illustrative embodiments, the data processing system, such as data processing system 100 in FIG. 1, provides a speculative multi-threading (SMT) environment in which the processing unit(s) 106 may execute multiple threads concurrently in a speculative manner. The data processing system 100 utilizes a speculative versioning cache (SVC) that supports the speculative execution of multiple concurrent threads. The SVC may be provided, for example, in a portion of a shared L1 or L2 cache, may be distributed over a plurality of L1 or L2 caches associated with a plurality of different processing unit(s) 106, or may be provided as a separate cache structure accessible by the processing unit(s) 106 and their processing cores. The SVC may store multiple versions of a cache line in cases where multiple threads are concurrently accessing the same cache line. The versions of the cache lines may be differentiated in the SVC by way of version identifiers (VIDs) associated with the cache lines. Thus, for example, multiple cache lines may have the same address tag but have different VIDs to thereby identify the cache lines being different versions of the same cache line, or a plurality of cache line versions of the same cache line set.

The mechanisms of the illustrative embodiments gather raw version pressure data about the various versions of cache lines utilized in the SVC and generate statistical version pressure information from the raw version pressure data. The statistical version pressure information may be utilized by software control mechanisms to control the execution of the threads in the data processing system so as to control the version pressure with regard to the various threads. The raw version pressure data is preferably gathered by hardware mechanisms provided in association with the speculative versioning cache and the thread execution hardware of the various processors. The statistical version pressure information may be generated by hardware mechanisms or may be generated by software processes, such as provided as part of compiler, operating system, or the like, based on the raw version pressure data.

Figure 3:
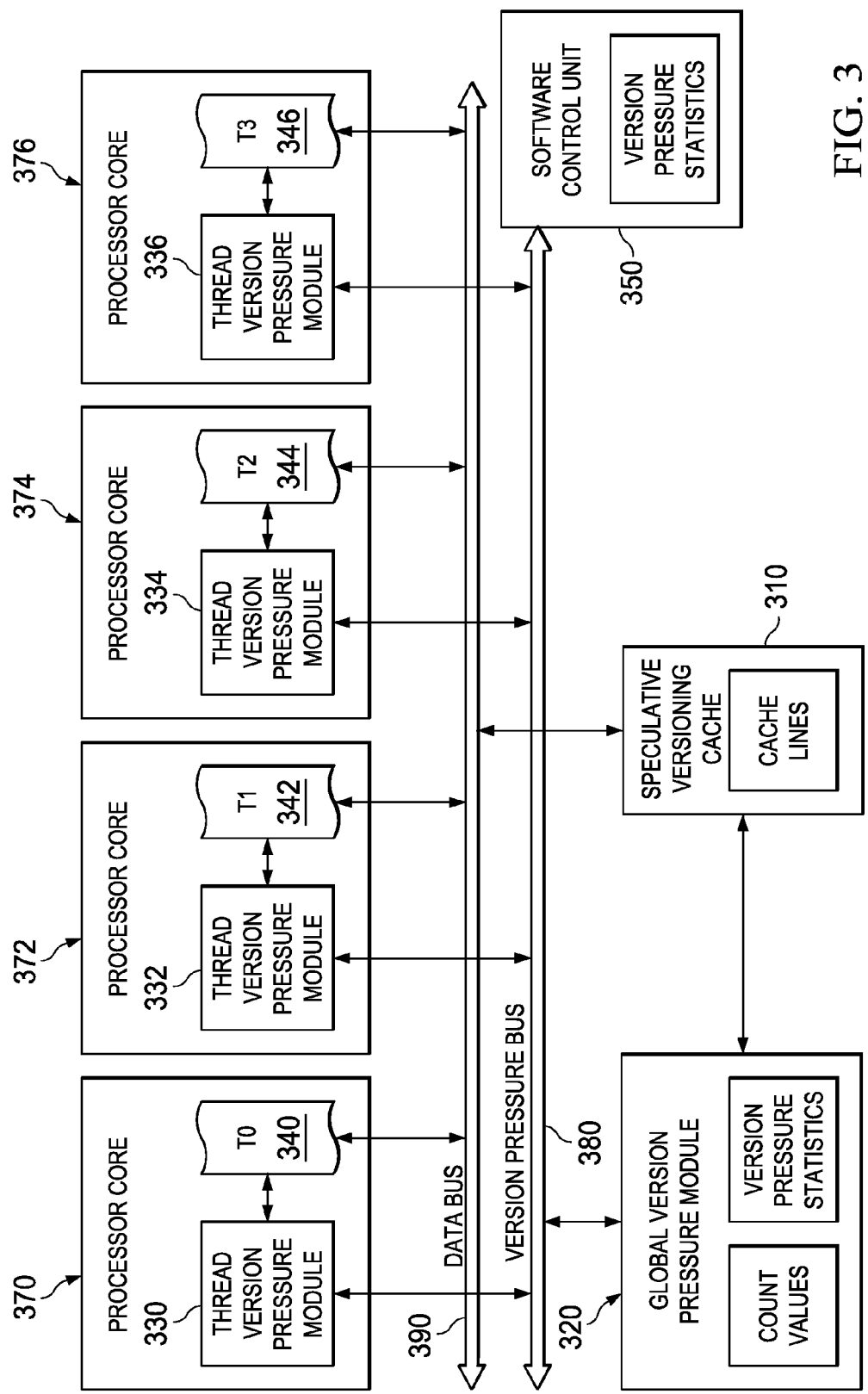
FIG. 3 is an example block diagram of the primary operational elements of one illustrative embodiment.

FIG. 3 is an example block diagram of the primary operational elements of one illustrative embodiment. As mentioned above, the version pressure module and speculative versioning cache mechanisms shown in FIG. 3 are preferably implemented in hardware while other elements, such as the software control unit 350, may be implemented as software executing on one or more processing devices.

Moreover, for simplicity, FIG. 3 will be described with regard to a single global version pressure module being provided in association with a single speculative versioning cache. However, it should be appreciated that the mechanisms of the illustrative embodiments may be distributed across a plurality of speculative versioning caches and a plurality of global version pressure modules in association with these speculative versioning caches. In still another illustrative embodiment, the single global version pressure module of FIG. 3 may be used in conjunction with a plurality of speculative versioning caches such that the single global version pressure module obtains raw version pressure data from these plurality of speculative versioning caches.

As shown in FIG. 3, the mechanisms of the illustrative embodiments include a speculative versioning cache 310 having an associated global version pressure module 320. The global version pressure module 320 maintains raw version pressure data and may comprise hardware and/or software that may generate version pressure statistic information based on this raw version pressure data. In addition, each of the processor cores 370-376 running a thread 340-346 has an associated thread version pressure module 330-336 for obtaining the raw version pressure data and/or the version pressure statistics information for its respective associated thread 340-346. A software control unit 350, which may be a compiler, an operating system, or the like, may be used in conjunction with the thread version pressure modules 330-336 and/or the global version pressure module 320 to determine an appropriate action to take to address version pressure issues within the speculative versioning cache 310 based on the raw version pressure data and/or the version pressure statistic information.

In the illustrative embodiment shown in FIG. 3, one thread 340-346 is associated with each core 370-376, respectively, and thread version pressure module 330-336. In other illustrative embodiments, there may be two or more threads associated with each core 370-376, in which case the two or more threads per core interact logically with one common shared thread version pressure module. In still other illustrative embodiments, the two or more threads per core each interact with their own private thread version pressure modules. Moreover, in other illustrative embodiments, the two or more threads may share a common thread version pressure module, but the common thread version pressure module may have some logic and state that is shared by all threads and other logic and state that is replicated so as to be private to each thread associated with the core.

In operation, typically when a conflict miss occurs, a cache handler determines a suitable candidate cache line to evict from the speculative versioning cache 310 taking into account any replacement policy that is being used by the speculative versioning cache 310, e.g., usage patterns (least recently used patterns), dirty bits (dirty cache lines require a write back to architected storage, clean cache lines do not), speculative state bits (speculative cache lines require thread squash), etc. In addition, with the mechanisms of the illustrative embodiments, when a conflict miss and replacement operation occurs, the global version pressure module 320 obtains a count of the number of versions of a cache line maintained in the speculative versioning cache 310 for the evicted cache line that is being replaced.

This count of the number of versions of an evicted cache line may be obtained in many different ways. For example, the count of the number of versions may be obtained by the global version pressure module 320 counting the number of cache line versions associated with the evicted cache line, such as by counting the number of bits on in an associativity range of the cache line. Alternatively, in some speculative versioning caches 310, pointers may be provided in cache lines pointing to a next version of the same cache line within the speculative versioning cache 310 and these pointers may be traversed with each new version of the cache line causing an increment in the count of the number of versions of the evicted cache line. Still further, a counter may be provided in the global version pressure module 320 in association with a set of cache lines when a cache line is loaded into the speculative versioning cache 310. This counter may be dynamically updated with each new version of the cache line generated in the speculative versioning cache 310 as threads attempt to modify the cache line.

The count obtained by the global version pressure module 320 may be used by the hardware of the global version pressure module 320, or a software control unit 350 executing on one or more processors of the data processing system, to generate version pressure statistic information for the set of cache lines associated with the counter. The version pressure statistic information may be generated for only the particular set of cache lines or may be aggregated with other version pressure statistic information for other sets of cache lines maintained by the speculative versioning cache 310. In one illustrative embodiment, the version pressure statistic information may be generated on a per cache line set basis such that the version pressure of a thread in association with a particular cache line set may be used to perform an action. In another illustrative embodiment, the version pressure statistic information may be generated on a per thread basis such that the version pressure of the thread in association with all of the cache line sets accessed by that thread may be used to perform an action. In still another illustrative embodiment, the version pressure statistic information may be generated on a per cache basis, such that the version pressure of the cache as a whole may be used as a basis for performing an action. Moreover, the version pressure statistic information may be aggregated over a plurality of speculative versioning caches such that the version pressure of the plurality of caches as a whole may be used as a basis for performing an action. In short, any individual or aggregate of the raw version pressure data may be used for generating version pressure statistic information and any individual or aggregate of the version pressure statistic information may be used to determine an appropriate action to address issues with regard to version pressure on one or more speculative versioning caches.

Either the raw version pressure data, the version pressure statistic information, or both are provided to the thread version pressure modules 330-336 in response to requests from the threads 340-346 for access to data of cache lines in the respective sets of cache lines in the speculative versioning cache 310. That is, when a thread, such as thread 340, sends a normal data request, e.g., a load/store request, to the speculative versioning cache 310, the data requested is returned to the thread 340 from the speculative versioning cache 310 and, along with this data, version pressure data/information is provided to the thread version pressure module 330, corresponding to the requesting thread 340, from the global version pressure module 320. The version pressure data/information provided in response to the request may be the version pressure data/information corresponding to the set of cache lines accessed by the request. As noted above, this data/information may further include version pressure statistics for the set of cache lines, the thread 340, the speculative versioning cache 310 as a whole, all of the speculative versioning caches in the data processing system, or the like. That is, the version pressure statistical information may be the aggregated statistical information that corresponds to the particular thread and/or set of cache lines. Alternatively, rather than sending version pressure statistic information, only the raw version pressure data may be transmitted to the thread version pressure modules with statistical information being generated by the thread version pressure modules, or a software control unit 350 working in conjunction with the thread version pressure modules, individually on the raw version pressure data they currently possess.

The propagation of the raw version pressure data/version pressure statistic information may require additional wires or additional data transfer cycles. However, it should be noted that the transfer of the raw version pressure data/version pressure statistic information is not critical to the operation of the system. Therefore, in one illustrative embodiment, the raw version pressure data/version pressure statistic information can be propagated from the global version pressure module 320 to the thread version pressure modules 330-336 via a slower, narrower bus, referred to in FIG. 3 as the version pressure bus 380, as opposed to the data bus 390. To assist in increasing the performance of the data processing system using a slower, narrower version pressure bus 380, in one illustrative embodiment, the raw version pressure data/version pressure statistic information may be pre-aggregated by the global version pressure module 320 before transmitting it across the version pressure bus 380, to thereby reduce communication bandwidth requirements.

In one illustrative embodiment, to further reduce the bus overhead, the version pressure bus 380 may be merged with another bus already present on the system, or may extend the functionality of another bus already present on the system. For example, the data processing environment 100 may have one or more performance monitoring busses that are used to monitor various performance counters, such as cache hit ratio counter(s), cache miss latency counter(s), branch hit ratio counter(s), and/or the like. The other bus may be present in the data processing environment 100 and may be suitable to be merged with the version pressure bus 380. In another illustrative embodiment, the version pressure bus 380 can be merged with the data bus 390, or with its related address bus.

In such an exemplary embodiment, the version pressure modules 320 and 330-336 can communicate when the data bus 380 or its related address bus are idle. Note also that FIG. 3 depicts the communication between caches 310 and cores 370-376 using buses. As will be appreciated by one of ordinary skill in the art in view of the present description, the illustrative embodiments are not limited to communication using buses and can be easily used with systems that utilize other communication structures, such as networks of dedicated links between any two pairs of communication agents (such as cores and caches), or any combinations of buses and dedicated links. The architecture shown in FIG. 3 is meant to only be an example of one illustrative embodiment and is not intended to be limiting with regard to the various implementations that may be made of the present invention or the illustrative embodiments described herein.

As mentioned above, the raw version pressure data may be used to generate version pressure statistic information that may then be used to determine appropriate actions for controlling the version pressure on the speculative versioning cache 310. Various types of version pressure statistic information may be generated by the mechanisms of the illustrative embodiments, e.g., in the global version pressure module 320, the individual thread version pressure modules 330-336, or a software control unit 350. This version pressure statistic information may be generated on a per thread basis, per cache basis, per data system basis, or the like.

For example, on a per thread basis, the generation of version pressure statistics may include obtaining the raw version pressure data, i.e. the count values for the various sets of cache lines touched by that particular thread, and then aggregating the raw version pressure data to generate one or more meaningful version pressure statistics. Such meaningful version pressure statistics include a maximum version pressure exerted by the thread on all of the sets of cache lines touched by the thread, average version pressure exerted by the thread across the various sets of cache lines touched by the thread, average version pressure exerted by the thread across the entire cache, maximum version pressure exerted by the thread on the entire cache, a total version pressure exerted by the thread on all of the sets of cache lines touched by the thread, or the like. That is, the version pressure exerted by a thread represents the particular threads' relative portion of number of versions of the cache lines in the particular set(s) of cache lines or cache as a whole. Thus, if a particular thread has a maximum raw version pressure count of 15 versions of a cache line in a set of cache lines, this maximum, relative to other threads accessing the same set of cache lines or the cache as a whole, may be quite large and represent a high version pressure exerted on the speculative versioning cache 310 by the particular thread.

As a further example, on a per cache basis, a similar aggregation of version pressure data may be used to generate meaningful version pressure statistics but with regard to all threads 340-346 and/or sets of cache lines in the speculative versioning cache 310. Thus, for example, the maximum and average values may be generated across all threads and all sets of cache lines in the speculative versioning cache 310, across all threads but for only a particular set of cache lines or sets of cache lines, or the like. The version pressure statistics may be gradually reduced, by recalculation of the version pressure statistic values, after each rollback or squashing of threads and may be gradually increased as higher version pressure statistic values are encountered.

The raw version pressure data, i.e. the count values for the various sets of cache lines, may be reset or reinitialized periodically or in response to detected events. For example, if a cache line is evicted, a thread is squashed, or the like, the corresponding raw version pressure data may be reset in the global version pressure module 320 and/or thread version pressure modules 330-336. In addition, the version pressure statistic information may likewise be reset or reinitialized periodically or in response to certain events such as those mentioned above. Moreover, the individual threads 340-346 may reset/reinitialize their own version of raw version pressure data/version pressure statistic information maintained in the thread version pressure modules 330-336 independently of the resetting/reinitializing of this data/information in other thread version pressure modules 330-336 or the global version pressure module 320.

It should be noted that the raw version pressure data and meaningful version pressure statistics may be provided in many different forms. For example, the data/information may be provided in terms of the absolute number of versions of the cache lines for the sets of cache lines in the speculative versioning cache 310. Alternatively, the data/information may be provided in terms of normalized values, e.g., a fraction of full capacity of the speculative versioning cache 310. Other formats of the raw data/statistic information may be used without departing from the spirit and scope of the illustrative embodiments.

Figure 4:
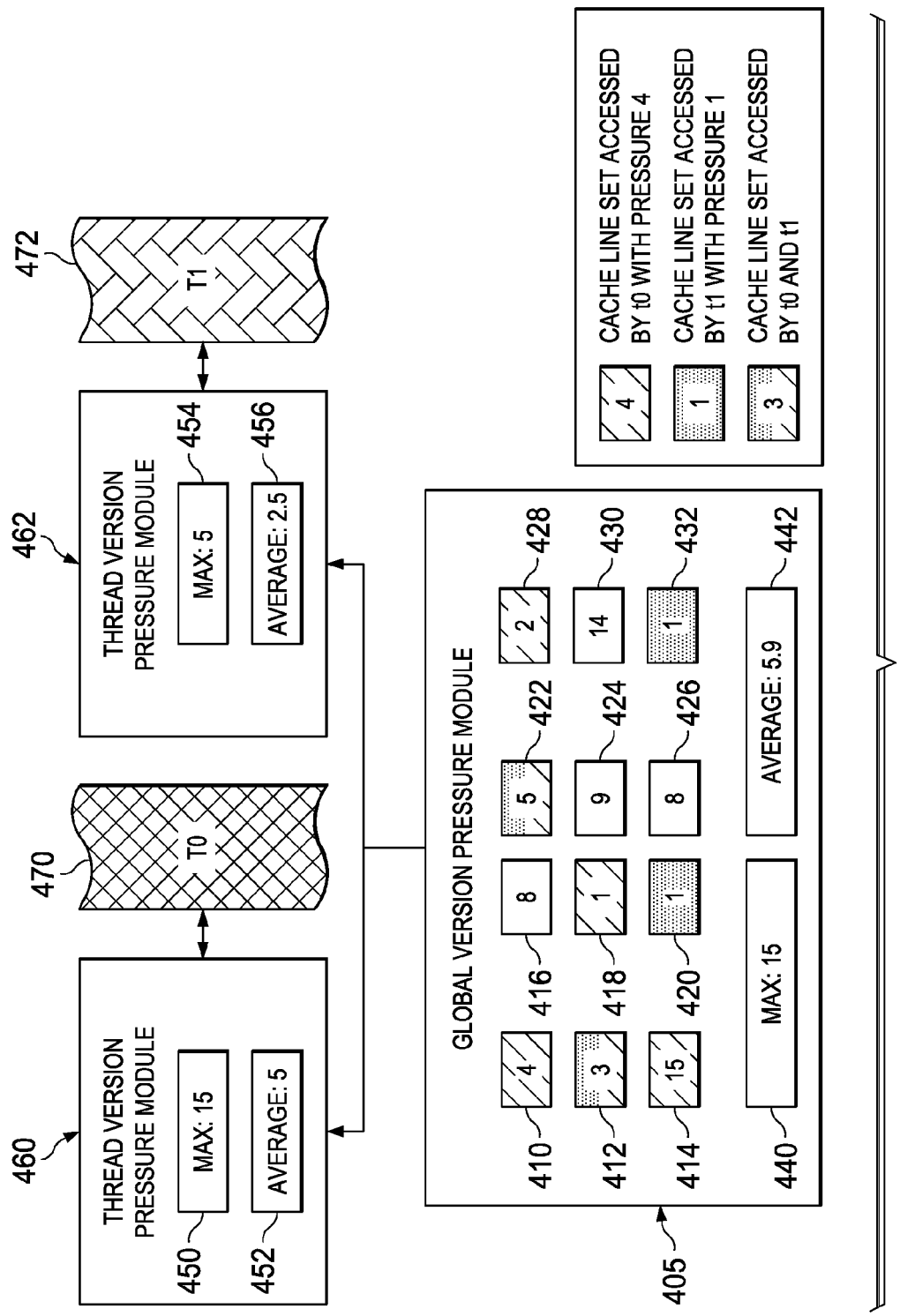
FIG. 4 is an example diagram illustrating the generation of meaningful version pressure statistics based on raw version pressure data in accordance with one illustrative embodiment.

FIG. 4 is an example diagram illustrating the generation of meaningful version pressure statistics based on raw version pressure data in accordance with one illustrative embodiment. As shown in FIG. 4, the global version pressure module 405 may generate counts 410-432 for various sets of cache lines of the speculative versioning cache. From this raw version pressure data 410-432, the global version pressure module 405 may generate version pressure statistic information 440-442 for the speculative versioning cache as a whole and, optionally, version pressure statistic information for individual threads 450-456. Moreover, in response to requests from threads 470-472, the global version pressure module 405 may provide the raw version pressure data 410-432 to the individual thread version pressure modules 460-462. In addition, or alternatively, the global version pressure module 405 may provide the version pressure statistic information 440-442 for the speculative versioning cache as a whole and/or the version pressure statistic information 450-452 to the individual thread version pressure modules 460-462 in response to requests, from the threads, for access to data in the speculative versioning cache.

For example, as shown in FIG. 4, thread 0 (labeled 470) is shown as having accessed or "touched" the cache line sets corresponding to count values 410, 412, 414, 418, 422, and 428. The total number of cache line versions in these sets of cache lines is 30 with a maximum number of cache line versions being 15 for the set of cache lines corresponding to the count value 414. The average number of cache line versions across all of the sets touched by thread 0 is 5. Similarly, as shown in FIG. 4, thread 1 (labeled 472) accessed or touched cache line sets corresponding to count values 412, 420, 422, and 432. The total number of cache line versions in these sets of cache lines is 10 with a maximum number of cache line versions being 5 for the set of cache lines corresponding to the count value 422. The average number of cache line versions across all of the sets touched by thread 1 is 2.5.

From these values, it can be determined thread 0 (labeled 470) exerts a high version pressure on the speculative version cache relative to thread 1 (labeled 472). Thus, an appropriate action, e.g., throttling of speculative execution, may need to be performed with regard to thread 0 so as to balance the version pressure exerted by thread 0 on the speculative versioning cache, as discussed in greater detail hereafter. Similarly, thread 1 exerts a relatively low version pressure on the speculative versioning cache and may increase speculative execution.

Moreover, as shown in FIG. 4, the maximum and average version pressure statistics may be generated for the speculative versioning cache as a whole. The total number of cache line versions in all of the sets of cache lines in the speculative versioning cache is 71 with a maximum number of cache line versions being 15 for the set of cache lines corresponding to the count value 414. The average number of cache line versions across all of the sets in the speculative versioning cache is 5.9 (71/12=5.9).

In one illustrative embodiment, these maximum and average values for the speculative versioning cache as a whole may serve as a basis for comparing the maximum and average version pressure statistics for the individual threads to determine whether a particular thread is exerting a relative high, average, or low version pressure on the speculative versioning cache. For example, for thread 0, since the maximum version pressure for the thread is the same as the maximum version pressure for the speculative versioning cache, and the average version pressure is close to the average for the speculative versioning cache as a whole, it may be deduced that thread 1 is exerting a relatively high version pressure on the speculative versioning cache. For thread 1, the maximum and average values are less than the maximum and average values for the speculative versioning cache as a whole and thus, may be considered to exert a relatively low version pressure on the speculative versioning cache. Various tolerance values may be established for determining whether maximum or average values are sufficient close or far away from the maximum and average values of the speculative versioning cache as a whole to determine whether a thread has high version pressure, average version pressure, or low version pressure.

As noted above, based on the version pressure statistic information gathered and/or generated by the global version pressure module and thread version pressure modules, a software control unit 350 in FIG. 3, may function to modify the operation of the data processing system with regard to the number of threads executing within the data processing system, the amount of work performed by the threads executing within the data processing system, the duration of transactions performed in a transaction memory system, or the like. The determination of when and how to modify the operation of the data processing system to balance version pressure amongst the threads may be performed by the software control unit 350, for example, during computations by corresponding threads, at various checkpoint times during the execution of a computer program, upon completion/failure of a thread's execution, or the like.

For example, with regard to modifying the operation of the data processing system to control the number of active threads, responsive to version pressure, the software control unit 350 may react by causing the data processing system to create additional threads to increase parallelism where version pressure is relatively low, and destroy existing threads to decrease version pressure and parallelism where the version pressure is determined to be relatively high. With regard to controlling the amount of work performed by threads, responsive to version pressure, the software control unit 350 may react by assigning large units of work to existing threads to increase effective parallelism where version pressure is relatively low, and assign smaller units of work to existing threads, or cause threads to be idle, to decrease version pressure and parallelism where version pressures is relatively high. With regard to controlling the duration of transactions, responsive to version pressure, the software control unit 350 may react by aggregating multiple units of speculations to lower transaction memory start/commit overheads where version pressure is determined to be relatively low, and disaggregate multiple units of speculation to lower version pressure where version pressure is determined to be relatively high.

FIG. 5 is an example portion of code illustrating a thread throttling action for addressing version pressure in accordance with one illustrative embodiment. With the thread throttling action, if the thread spawning conditions, other profitability metrics, and the version pressure is less than a predetermined threshold, then an additional speculative thread is spawned to perform work. Essentially, this action generates more speculative threads when the version pressure is below the threshold and other conditions and metrics indicate that the spawning of the speculative thread may be performed. However, if the threshold is met or exceeded, no additional speculative threads are spawned.

The particular threshold against which version pressure is measured may vary dynamically. For example, the threshold may vary as a function of the number of speculative threads currently active in the data processing system. For example, in one illustrative embodiment, the non-speculative thread may spawn a speculative thread if the version pressure is smaller than a static predetermined threshold, e.g., 50%, i.e. the non-speculative thread exerts less than 50% of the version pressure on the speculative versioning cache. In another illustrative embodiment, a first speculative thread may be spawned when the version pressure is less than 30% and a second speculative thread may be spawned when the version pressure is less than 20%, and so on. Thus, the threshold becomes more stringent as the number of speculative threads executing increases.

On a per-thread version pressure basis, it would be beneficial for the non-speculative thread to perform some work to gather meaningful version pressure data prior to determining whether to spawn an additional speculative thread or not. On a global version pressure basis, i.e. using the version pressure information for the speculative versioning cache as a whole, the global version pressure statistics information may be reset when a predetermined number of threads complete execution.

Upon determining that the version pressure is too high, the software control unit 350 may squash speculative threads in order to reduce version pressure on the speculative versioning cache. The particular speculative threads that may be squashed may be determined based on how far they are away from the non-speculative thread that spawned them. For example, if a non-speculative thread spawns two additional speculative threads, the second speculative thread may be squashed first, followed by the first speculative thread. Alternatively, the speculative threads to squash may be prioritized based on the speculative threads exerting the most version pressure on the speculative versioning cache. That is, those speculative threads exerting the most version pressure on the speculative versioning cache may be squashed first followed by a next speculative thread exerting a next highest version pressure on the speculative versioning cache, and so on. In still another illustrative embodiment, a combination of these approaches may be used wherein the speculative threads that are furthest away from the non-speculative thread and exert the highest version pressure may be selected for squashing first.

FIG. 6 is an example portion of code illustrating a workload throttling action for addressing version pressure in accordance with one illustrative embodiment. As shown in FIG. 6, depending on the version pressure, the amount of speculating work being done by a speculative thread is increased or decreased. With high version pressure, a smaller amount of work being performed by a speculative thread reduces the granularity of speculation and thus, reduces the amount of cache lines generally accessed or touched by the speculating threads. The amount of work given to a speculative thread may vary dynamically, such as a function of the number of speculative threads active in the data processing system. It should be noted that the functionality of the code outlined in FIG. 6 may be combined with the functionality of the code in FIG. 5 in some illustrative embodiments.

Again, on a per-thread version pressure basis, it would be beneficial for the non-speculative thread to perform some work to gather meaningful version pressure data prior to determining whether to spawn an additional speculative thread or not. On a global version pressure basis, i.e. using the version pressure information for the speculative versioning cache as a whole, the global version pressure statistics information may be reset when a predetermined number of threads complete execution.

FIG. 7 is an example portion of code illustrating an idling thread action for addressing version pressure in accordance with one illustrative embodiment. Initially, a fixed number of threads are initially created and each take work in turn. While the initial number of threads may be modulated as a function of the expected version pressure, here the scheme is to dynamically adapt the effective number of speculating threads by placing some threads in an idle state. Specifically, the "wait" in the depicted code pauses the current thread if the pressure threshold is above a given amount. In another illustrative embodiment, the "wait" in the depicted code pauses the current thread until the version pressure drops below the given threshold. The wait state can further be exited in response to a given amount of time lapsing, or other events not specifically shown in FIG. 7. The amount of time that the thread is idle can be a predetermined amount of time, or a varying amount of time, depending on various factors, including the version pressure. It should be noted that the functionality of the code outlined in FIG. 7 may be combined with the functionality of the code in FIGS. 5 and/or 6 in some illustrative embodiments.

FIG. 8 is an example diagram illustrating a transaction aggregation action for addressing version pressure in accordance with one illustrative embodiment. As shown in FIG. 8, traditionally a transaction is committed immediately after the work associated with transaction is completed. However, with the mechanisms of the illustrative embodiments, the work of transactions may be conditionally aggregated until the version pressure on the speculative versioning cache meets or exceeds a threshold.

In other words, code is initially generated with the smallest possible critical region protected by a transaction. However, the point at which this critical region is closed is determined dynamically. That is, critical regions of transactions may be combined into a single transaction until it is determined that the version pressure is too high. Once the version pressure is too high, the transaction may be closed and the transaction committed. Of course other metrics may be taken into account when determining when to close a transaction. For example, a maximum number of transactions to aggregate may be set and a transaction may be closed either when the version pressure gets too high or the number of transactions aggregated reaches this maximum number. Further, a degree of parallelism may be taken into account, e.g., a number of concurrent threads executing on the same data, when determining when to close a transaction. The number of concurrent threads is typically known by the "master" thread, i.e. the thread that initiated all of the other "worker" threads (that is, the worker threads are the ones performing the work, including the non-guarded work as well as the guarded work, as depicted in FIG. 8). The number of concurrent threads can be set by the master thread in a global variable that can be read by the worker threads and used in conjunction with the version pressure information in order to assist them to determining when to dynamically close transactions.

The particular transactions to aggregate together may be selected in a number of different ways. For example, tasks or transactions that result in high version pressure and tasks/transactions that result in low version pressure may be aggregated together in the same transaction so as to average their version pressures. Alternatively, several low version pressure tasks/transactions may be aggregated together. Still further, a determination may be made dynamically before closing a transaction as to whether the aggregation of a next transaction will put the expected version pressure of the transaction above a maximum threshold and if not, the next transaction may be aggregated with the current transaction. If the next transaction would cause the expected version pressure to exceed the maximum threshold, the transaction may be closed without aggregating the next transaction.

The modifications of the operation of the data processing system performed by the software control unit may be effected in a number of different ways. Primarily, the code of a computer program is transformed by the software control unit so as to respond to the version pressure in the various ways discussed above, e.g., by increasing/decreasing the number of speculative threads, increase/decreasing the amount of speculative work performed by the threads, aggregating/not aggregating transactions, and the like. Of course, other types of modifications to the operation of the data processing system based on the determined version pressure statistics may be used by the mechanisms of the illustrative embodiments without departing from the spirit and scope of the illustrative embodiments.

Figure 9:
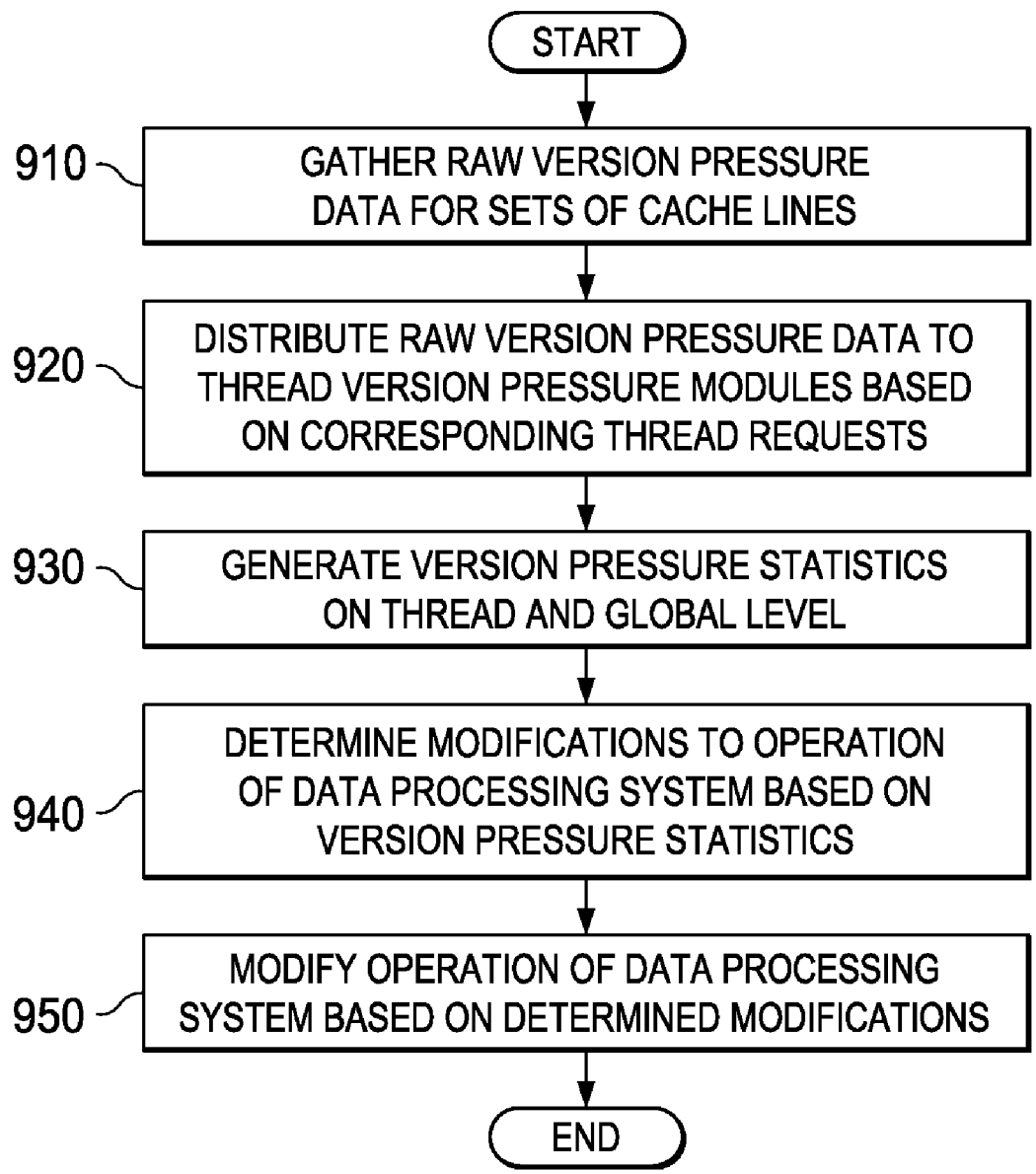
FIG. 9 is a flowchart outlining an example operation for using version pressure feedback to adjust the operation of a data processing system in accordance with one illustrative embodiment.

FIG. 9 is a flowchart outlining an example operation for using version pressure feedback to adjust the operation of a data processing system in accordance with one illustrative embodiment. As shown in FIG. 9, the operation starts with gathering raw version pressure data for sets of cache lines in a speculative versioning cache (step 910). The raw version pressure data is distributed to thread version pressure modules based on their corresponding thread requests (step 920). As discussed above, this raw version pressure data may be obtained using counters associated with cache lines of the speculative versioning cache, for example.

Version pressure statistics are generated on both a thread and global level (step 930). Based on the version pressure statistics, modifications to be performed on the operation of the data processing system are determined to balance/reduce the version pressure on the speculative versioning cache (step 940). As noted above, these version pressure statistics may be any statistical measure of version pressure generated based on the raw version pressure data. For example, these version pressure statistics may be the maximum and average version pressure for particular threads, the speculative versioning cache as a whole, or the like. In a preferred illustrative embodiment, both global and thread-specific version pressure statistics are generated. However, to reduce hardware cost, or for other reasons, some illustrative embodiments may only implement version pressure statistics for the entire cache system, for specific caches in the cache hierarchy, for multiple threads co-residing in a core, for each individual threads, or the like.

The operation of the data processing system is then modified based on the determined modifications to be performed (step 950). The operation then ends. As discussed above, these modifications may involve transforming code by throttling the number of speculative threads, squashing speculative threads, throttling an amount of work executed by speculative threads, making existing threads enter an idle state, aggregating transactions, or the like. This operation may be repeated on a continual basis, periodic basis, or in response to the occurrence of predetermined events.

Thus, the illustrative embodiments provide mechanisms for monitoring the version pressure exerted by threads on a speculative versioning cache and using this version pressure information to effect changes in the operation of a data processing system to reduce the version pressure on the speculative versioning cache and/or balance the version pressure exerted by the threads. The illustrative embodiments gather raw version pressure information, generate statistical measures of the version pressure, and use the statistical measures to determine what types of modifications to apply to the execution of code in the data processing system. In this way, the version pressure exerted on the speculative versioning cache may be controlled so as to minimize the costs of squashing speculative threads in the data processing system due to excessive version pressure on the speculative versioning cache.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for controlling version pressure on a speculative versioning cache of the data processing system, comprising:
   collecting version pressure data based on one or more threads, executing on one or more processors of the data processing system, accessing cache lines of the speculative versioning cache stored in a storage device of the data processing system;
   determining whether one or more modifications to an operation of the data processing system are to be performed based on the version pressure data, wherein the one or more modifications, when performed, affect version pressure exerted on the speculative versioning cache; and
   modifying an operation of the data processing system based on the one or more determined modifications, in response to a determination that one or more modifications to the operation of the data processing system are to be performed, to affect the version pressure exerted on the speculative versioning cache.

2. The method of claim 1, further comprising generating one or more statistical measures of version pressure based on the collected version pressure data, wherein determining whether one or more modifications to an operation of the data processing system are to be performed comprises performing the determination based on the one or more statistical measures of version pressure.

3. The method of claim 2, wherein the one or more modifications comprises throttling a number of speculative threads spawned in the data processing system by at least one of creating one or more additional threads to increase parallelism when the one or more statistical measures of version pressure indicate version pressure on the speculative versioning cache is relatively low, or destroying one or more existing threads to decrease version pressure and parallelism when the one or more statistical measures of version pressure indicate version pressure on the speculative versioning cache is relatively high.

4. The method of claim 2, wherein the one or more modifications comprises throttling an amount of speculative work performed by one or more speculative threads executing in the data processing system by at least one of assigning large units of work to existing threads to increase effective parallelism when the one or more statistical measures of version pressure indicate version pressure on the speculative versioning cache is relatively low, or assigning smaller units of work to existing threads, or cause threads to be idle, to decrease version pressure and parallelism when the one or more statistical measures of version pressure indicate version pressure on the speculative versioning cache is relatively high.

5. The method of claim 2, wherein the one or more modifications comprises aggregating a plurality of transactions into a single transaction executed within the data processing system by at least one of aggregating multiple units of speculation to lower transaction memory start/commit overheads when the one or more statistical measures of version pressure indicate version pressure on the speculative versioning cache is relatively low, or disaggregating multiple units of speculation to lower version pressure when the one or more statistical measures of version pressure indicate version pressure on the speculative versioning cache is relatively high.

6. The method of claim 2, wherein the collecting and generating operations are performed in hardware of the data processing system, and wherein the determining and modifying operations are performed in software executing on one of the data processing system or in a different data processing system.

7. The method of claim 1, wherein collecting version pressure data based on threads executing in the data processing system accessing cache lines of the speculative versioning cache comprises using one or more thread version pressure modules implemented in hardware of the one or more processors of the data processing system to collect the version pressure data, wherein each version pressure module collects version pressure data from a thread executing on a corresponding processor in which the thread version pressure module is implemented.

8. The method of claim 2, wherein collecting version pressure data comprises:
   collecting, in response to a conflict miss and replacement operation occurring in the speculative versioning cache, where a cache line is evicted from the speculative versioning cache and is being replaced, a count of a number of versions of a cache line maintained in a speculative versioning cache for the evicted cache line.

9. The method of claim 8, wherein generating one or more statistical measures of version pressure based on the collected version pressure data comprises:

generating one or more statistical measures of version pressure for a cache line set in which the evicted cache line was present based on the count.

10. The method of claim 9, wherein generating one or more statistical measures of version pressure based on the collected version pressure data further comprises:
aggregating the one or more statistical measures of version pressure for the cache line set with one or more statistical measures of version pressure for one or more additional cache line sets in the speculative versioning cache.

11. The method of claim 10, wherein the cache line set and the one or more additional cache line sets are cache line sets accessed by a same thread.

12. The method of claim 2, wherein the one or more statistical measures of version pressure are generated on at least one of a per thread basis, a per speculative versioning cache basis, or a per data processing system basis.

13. The method of claim 12, wherein the one or more statistical measures of version pressure include at least one of a maximum version pressure exerted by a thread on all cache line sets accessed by the thread, an average version pressure exerted by the thread across all of the cache line sets accessed by the thread, an average version pressure exerted by the thread across all of the cache line sets in the entire speculative versioning cache, a maximum version pressure exerted by the thread on the entire speculative versioning cache, or a total version pressure exerted by the thread on all of the cache line sets accessed by the thread.

14. The method of claim 12, wherein the one or more statistical measures of version pressure include at least one of a maximum or an average version pressure across all threads and all cache line sets in the speculative versioning cache, or a maximum or an average version pressure across all threads but for only a particular cache line sets or subset of cache line sets in the speculative versioning cache.

15. The method of claim 2, wherein:
the version pressure data is collected by a hardware implemented global version pressure module coupled to a speculative versioning cache storage device of the data processing system,
generating one or more statistical measures of version pressure comprises generating at least one global statistical measure of version pressure and at least one thread level statistical measure of version pressure, and
the determination as to whether one or more modifications to an operation of the data processing system are to be performed is based on one or both of the at least one global statistical measure of version pressure and the at least one thread level statistical measure of version pressure.

16. The method of claim 15, wherein the determination as to whether one or more modifications to an operation of the data processing system are to be performed is based on a comparison of the at least one global statistical measure of version pressure with the at least one thread level statistical measure of version pressure.

17. The method of claim 15, further comprising:
distributing, from the global version pressure module to one or more thread level version pressure modules implemented in hardware of one or more processors of the data processing system, version pressure data corresponding to threads associated with the individual one or more thread level version pressure modules, wherein the one or more thread level statistical measures of version pressure are generated by the one or more thread level version pressure modules for their associated threads.

18. The method of claim 17, wherein:
the version pressure data is distributed from the global version pressure module to the one or more thread level version pressure modules via a version pressure bus coupled to the global version pressure module and the one or more thread level version pressure modules, and
version pressure data is distributed from the global version pressure module to a thread level version pressure module in the one or more thread level version pressure modules via the version pressure bus in response to, and at approximately a same time as, data being returned to a thread corresponding to the thread level version pressure module from the speculative versioning cache via a data bus.

19. The method of claim 15, wherein the determining and modifying operations are performed by a software control unit coupled with the global version pressure module and the one or more thread level version pressure modules.

20. A computer program product comprising a computer recordable medium having a computer readable program recorded thereon, wherein the computer readable program, when executed on a computing device, causes the computing device to:
collect version pressure data based on one or more threads, executing on one or more processors of the data processing system, accessing cache lines of the speculative versioning cache stored in a storage device of the data processing system;
determine whether one or more modifications to an operation of the data processing system are to be performed based on the version pressure data, wherein the one or more modifications, when performed, affect version pressure exerted on the speculative versioning cache; and
modify an operation of the data processing system based on the one or more determined modifications, in response to a determination that one or more modifications to the operation of the data processing system are to be performed, to affect the version pressure exerted on the speculative versioning cache.

21. A data processing system, comprising:
one or more processors, each processor having at least one thread level versioning cache module implemented in hardware of the processor;
a speculative versioning cache storage device coupled to the one or more processors;
a hardware implemented global versioning cache module coupled to the speculative versioning cache storage device; and
a software control unit coupled to the one or more processors and the hardware implemented global versioning cache module, wherein:
the hardware implemented global versioning cache module collects version pressure data based on one or more threads accessing cache lines of the speculative versioning cache,
at least one of the hardware implemented global versioning cache module or the at least one thread level versioning cache module generates one or more statistical measures of version pressure based on the collected version pressure data,
the software control unit determines whether one or more modifications to an operation of the data processing system are to be performed based on the one or more statistical measures of version pressure, the one or more modifications affecting version pressure exerted on the speculative versioning cache, and the software control unit modifies an operation of the computing device based on the one or more determined modifications, in response to a determination that one or more modifications to the operation of the computing device are to be performed, to affect the version pressure exerted on the speculative versioning cache.

* * * * *